United States Patent Office 3,519,435
Patented July 7, 1970

3,519,435
FRACTIONATING 99 TO 100% MILK FAT AND MAKING BUTTER FROM THE SEPARATED FATS
Marjorie S. MacCollom, 168 Winston Way, De Witt, N.Y. 13214
No Drawing. Filed Jan. 17, 1967, Ser. No. 609,741
Int. Cl. A23c 15/12, 15/14
U.S. Cl. 99—118                              5 Claims

ABSTRACT OF THE DISCLOSURE

The fractionation of fats of different melting points from 99 to 100% milk fat by crystallization and subsequent separation by filtering, centrifuge, or decanting, and the manufacture of butter, and other products containing the fractionated fats.

BACKGROUND OF THE INVENTION

Milk fat contains a number of different fats having different characteristics. For example, the melting points of fats vary over a range of 170° F., some are saturated fats, and others are unsaturated. Milk fat contains varying percentages of its constituent fractions depending upon the season of the year, and the nature of the feed consumed by the cows producing the milk. Accordingly, the texture and body of butter and of other products made from the milk fat, as well as the melting point thereof, follows a more or less regular annual cycle.

This means the ratio of saturated to unsaturated fats in butter fat varies seasonally.

Butter, as now made from milk, has a melting point in about the range from 85° to 95° F. For the production of many products, it would be particularly desirable to substantially increase or decrease the melting point of butter, or other milk fat containing products.

It is therefore economically beneficial to be able to produce milk fat having a melting point tailored to fit in the production of many products, and to be able to produce the tailored fat consistently from milk produced throughout the entire year. However, prior to this invention, milk fat is processed and used only as it comes from the cow, containing all of its constituent fats which vary in the manner above stated.

SUMMARY OF THE INVENTION

This invention has as an object the method of efficiently and economically fractionating milk fats of varying melting points from 99–100% milk fat, and production of products, including butter, containing the separated fats, or the separated fats in a desired ratio having the most desirable characteristics for the production of the butter or other product.

The 99–100% milk fat is treated to effect crystallization of all the individual fats. The lowest melting point fats are removed. This may be done as by scraping, or dipping, these fats from the surface of the mass. The high melting point fats are then separated from the remaining low melting point fats. The fractionated hard and soft fats can be combined in a selected ratio to provide desired characteristics, such as a particular melting point for use in manufacture of butter and other various products.

DESCRIPTION OF THE PREFERRED EMBODIMENTS

In the practice of the invention, 99.6% milk fat was used. This was obtained directly from milk by a first separation to produce cream having 40% fat, and a second separation to produce cream having 80% fat, which was then run through anhydrous equipment to raise the fat content to 99.6%. If the fractionated fats are to be made into butter, or other milk fat containing products which are required by various definitions of the Federal Food and Drug Administration to be made directly from milk or cream or a mixture of both, the 99.6% milk fat is produced in the above manner. For the production of butter and various other milk fat containing products, the liquid anhydrous milk fat is not discharged through the cooling and chilling equipment, as is usually done in the production of what is known as anhydrous milk fat, but instead is treated directly in accordance with the process as hereinafter explained.

If the fractionated fats are to be used to make products not designated as butter, or other milk fat containing products which are required by various definitions of the Federal Food and Drug Administration to be made directly from milk or cream or a mixture of both, the 99.6% milk fat may be in the form of conventionally cooled anhydrous milk fat or butter oil or slowly cooled anhydrous milk fat or butter oil.

If the 99.6% milk fat is in the form of conventionally cooled anhydrous milk fat or butter oil, it is rendered completely liquid at a temperature in excess of 130° F. From this state, the fat is slowly cooled preferably by not exceeding a temperature drop of 1½° to 2° per hour, until a temperature of 0° F. is reached.

During this cooling period, agitation of the milk fat is not necessary, but I prefer gentle movement of the mass for a period of about two minutes every half hour until a temperature of about 70° is reached, or until the mass is passing from the slurry stage to the crystalline stage and further agitation becomes impracticable. This temperature will vary somewhat according to the melting point of the initial milk fat which, in turn, will vary according to the season of the year and other factors, as pointed out above. From 70° F. to 0° F. the mass is not agitated.

During this cooling cycle, all of the fats are crystallized, or hardened. When the 0° F. temperature has been reached, the lowest melting point fat crystals will have collected at the top of the mass and can be removed by being scraped, or smoothed off, from the mass. The remaining hardened mass is then slowly warmed to about 72° to 76° F. to a slurry state. The higher melting point fats of the mass remain in crystallized form and are separated from the mass leaving the low melting point fat.

Equally good results are obtained in the separation of the crystallized hard fats from the warmed mass by filtration, or by mechanical means, such as a solid bowl centrifuge of the basket type, or a separator such as the DeLaval No. 425 equipped with short disks.

A fair degree of separation of the hard and soft fats can be obtained by allowing the hard fat crystals to gather at the bottom of the vat and decanting the liquid soft fats from the upper part of the vat. However, filtration, or the use of the centrifuge is preferred.

The following table sets forth the melting points of fatty acids of milk fat.

"THE BUTTER INDUSTRY"—3rd edition
by
Otto Frederick Hunziker, page 591
Percentage Range of Fatty Acids of Milk Fat and Their
Melting Points (Stout)

| Fatty acids | Molecular weight | Range of percentage | Melting Point °C. | Melting Point °F. |
|---|---|---|---|---|
| Saturated: | | | | |
| Butyric | 88 | 2.2–5.5 | −8 | 17.6 |
| Caproic | 116 | 1.3–3.3 | −9.5 | 14.9 |
| Caprylic | 144 | 0.5–1.9 | 16.5 | 61.1 |
| Capric | 172 | 0.3–3.0 | 31 | 87.8 |
| Lauric | 200 | 2.6–7.7 | 48 | 118.4 |
| Myristic | 228 | 9.9–22.6 | 58 | 136.4 |
| Palmitic | 256 | 5.8–38.6 | 64 | 147.2 |
| Stearic | 284 | 1.8–20.4 | 69 | 158.2 |
| Arachidic | 342 | 0.0–1.2 | 77 | 170.6 |
| Unsaturated: | | | | |
| Oleic | 282 | 25.3–48.3 | 14 | 57.2 |
| Linoleic | 280 | 0.0–5.4 | −18 | −0.6 |

In the process above described, the 99.6% milk fat was cooled slowly from a temperature above 130° F. to 0°, which brought about the crystallization of all the fats, including the lowest melting point fats which were initially separated from the mass. If the process is practiced basically for the production of butter, or other milk fat containing products, the initial milk fat needs only to be cooled down until a temperature of 68°–60° F. is reached. When the mass, so cooled, is warmed to 72°–76° F., and the high melting point fat fraction is separated from the low melting point fraction, the lowest melting point fats will be included in the latter fraction which may be manufactured into butter and other milk fat products.

One of the methods of manufacturing butter from the milk fat fraction having the desired melting point, is to proceed as for a continuous butter operation. The fractioned milk fat is introduced into the continuous butter process where the liquid anhydrous milk fat is ordinarily introduced i.e., into the composition vats. The required proportions of cultured skim milk, water, diacetyl distillate, salt and butter color if required, are added in the composition vats and the butter making proceeds as for making usual butter. However, much lower temperatures will be required to chill the butter and prepare it for the Texturator, or other butter worker. The butter as it leaves the butter worker resembles usual butter in appearance, the flavor and color being extremely good, the body tending to be short and possibly slightly grainy. The butter is firm enough for bulk packaging, or for printing and wrapping as it leaves the machine.

A method of making whipped butter is to feed the mix from the composition vat into a continuous ice-cream freezer. Enough refrigeration is allowed into the freezer to stiffen the product to the consistency of ice-cream. Nitrogen gas instead of air is applied to the freezer barrel to produce the over-run for whipped butter.

By combining the separated high melting point and low melting point fats in various percentages, the mixture may be made to have different melting points. For example, a high percentage of the low melting point, or high melting point fats, can be employed in manufacturing other dairy products with, or without, added water, stabilizers, vitamins, etc., such as fluid whole milk, fluid skim milk, fluid partly skimmed milk, light cream, heavy cream, plastic cream, fluid cultured buttermilk, condensed cultured buttermilk, dried cultured buttermilk, butter, whipped butter, evaporated whole milk, condensed whole milk, condensed skim milk, sterile canned milk, sweetened condensed milk, whole milk powder, butter oil, anhydrous milk fat, cream powder, cheese, cream cheese, ice-cream mix, powdered ice-cream mix, egg-nog, modified baby milks, modified diet milks and others.

The separated low melting point and high melting point fats can be combined in ratios to tailor the mixture for a particular use, as may be required in food baking, food canning, food freezing, milk chocolate and confectionery industries, and the like. The lower melting point soft fat results in more tender body and even texture, with smaller, more uniform, air interstices which is advantageous for certain uses, as cake baking. The higher melting point hard fat is particularly valuable in the ice-cream business since it greatly improves the body and viscosity of the mix, and makes the ice-cream taste richer. In like manner, the hard fat improves the viscosity in milk chocolate products and lessens the need for additional cocoa butter. The addition of the lowest melting point fraction imparts a strong butter flavor to other foods. The milk fat fractions can be used to great advantage in the manufacture of oleomargarine.

I claim:
1. The method of treating a volume of 99–100% milk fat including the steps of cooling the milk fat from a temperature in excess of 130° F. at the rate not exceeding 4° F. per hour until the temperature of 0° F. is reached to effect crystallization of the constituent fats of the milk fat, separating the lowest melting point fat crystals from the cooled milk fats, heating the remainder of the cooled milk fat to a temperature of 72° F.–76° F., and separating the high melting point fat crystals from the remaining milk fat.

2. The method of treating a mass of 99%–100% milk fat including the steps of cooling the milk fat from a temperature in excess of 130° F. at the rate not exceeding 4° F. per hour, until a temperature of 60° F.–68° F. is reached to effect crystallization of the high melting point fats, warming the milk fat to a temperature of 72° F.–76° F., and separating the high melting point fat crystals from the milk fat.

3. The method as set forth in claim 2, wherein gentle agitation is applied to the milk fat during the cooling step.

4. The method as set forth in claim 2 wherein gentle agitation is applied to the milk fat periodically during the cooling step.

5. The continuous method of making butter comprising the steps of processing milk, cream, or a mixture of both, to contain 99%–100% milk fat, cooling the milk fat from a temperature in excess of 130° F. at a rate not exceeding 4° F. per hour, until a temperature of 60° F.–68° F. is reached to crystallize the high melting point fats, warming the milk fat to 72° F.–76° F., separating the high melting point fat crystals, and processing the separated fats respectively, or in the desired ratio, with permitted additives into butter.

References Cited

UNITED STATES PATENTS 2,619,421  11/1952  Greenfield _____ 99—118
3,026,207   3/1962  Murray _____ 99—123 X
3,080,235   3/1963  Hodson et al. _____ 99—62 X

OTHER REFERENCES

Chemical Abstracts, vol. 47, 1953, 11589c.
Hilditch, T. P. et al.: The Chemical Constitution of Natural Fats, 4th ed., John Wiley & Sons, Inc., N.Y., 1964, p. 412.
McDowall, F. A.: Buttermakers Manual, vol. 1, 1953, New Zealand Univ. Press, Wellington, pp. 57 and 67.

MAURICE W. GREENSTEIN, Primary Examiner

U.S. Cl. X.R.

99—62, 119